United States Patent
Chen (10) Patent No.: US 10,509,520 B2
(45) Date of Patent: Dec. 17, 2019

(54) TOUCH PANEL

(71) Applicant: AU OPTRONICS CORPORATION, Hsin-chu (TW)

(72) Inventor: Ping-Lin Chen, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/925,978

(22) Filed: Mar. 20, 2018

(65) Prior Publication Data
US 2018/0299988 A1    Oct. 18, 2018

(30) Foreign Application Priority Data

Apr. 17, 2017 (TW) .............................. 106112818 A (51) Int. Cl.
*G06F 3/044* (2006.01)
*G06F 3/041* (2006.01)
*G09G 3/20* (2006.01)

(52) U.S. Cl.
CPC ............ *G06F 3/044* (2013.01); *G06F 3/0412* (2013.01); *G06F 3/0418* (2013.01); *G09G 3/20* (2013.01); *G09G 2310/0267* (2013.01); *G09G 2310/0286* (2013.01)

(58) Field of Classification Search
CPC ...... G06F 3/0412; G06F 3/0418; G06F 3/044; G09G 3/20; G09G 2310/0286
See application file for complete search history.

(56) References Cited

U.S. PATENT DOCUMENTS

| | | | |
|---|---|---|---|
| 7,817,771 | B2 | 10/2010 | Tsai et al. |
| 8,023,613 | B2 | 9/2011 | Tsai et al. |
| 8,811,567 | B2 | 8/2014 | Wu et al. |
| 2017/0010731 | A1* | 1/2017 | Zhang .................... G11C 19/28 |
| 2017/0235408 | A1* | 8/2017 | Yang ..................... G06F 3/0412 |
| | | | 345/174 |

FOREIGN PATENT DOCUMENTS

| | | |
|---|---|---|
| CN | 103943083 A | 7/2014 |
| CN | 105528118 A | 4/2016 |

OTHER PUBLICATIONS

Office Action issued by the State Intellectual Property Office of the Peoples Republic of China dated Jun. 26, 2019 for Application No. CN201710550483.6.

* cited by examiner

*Primary Examiner* — Nelson M Rosario
(74) *Attorney, Agent, or Firm* — Tim Tingkang Xia, Esq.; Locke Lord LLP (57) ABSTRACT

A touch panel includes a first gate drive circuit, a first touch circuit, a second gate drive circuit, and a second touch circuit. The first touch circuit is connected to the first gate drive circuit and includes a first capacitor. The second touch circuit is connected to the second gate drive circuit and includes a second capacitor. The first capacitor and the second capacitor are connected in parallel.

6 Claims, 9 Drawing Sheets

TOUCH PANEL

CROSS-REFERENCE TO RELATED PATENT APPLICATION

This non-provisional application claims priority to and the benefit of, pursuant to 35 U.S.C. § 119(a), patent application Serial No. 106112818 filed in Taiwan on Apr. 17, 2017. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present disclosure relates to a touch panel.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Figure 1A:
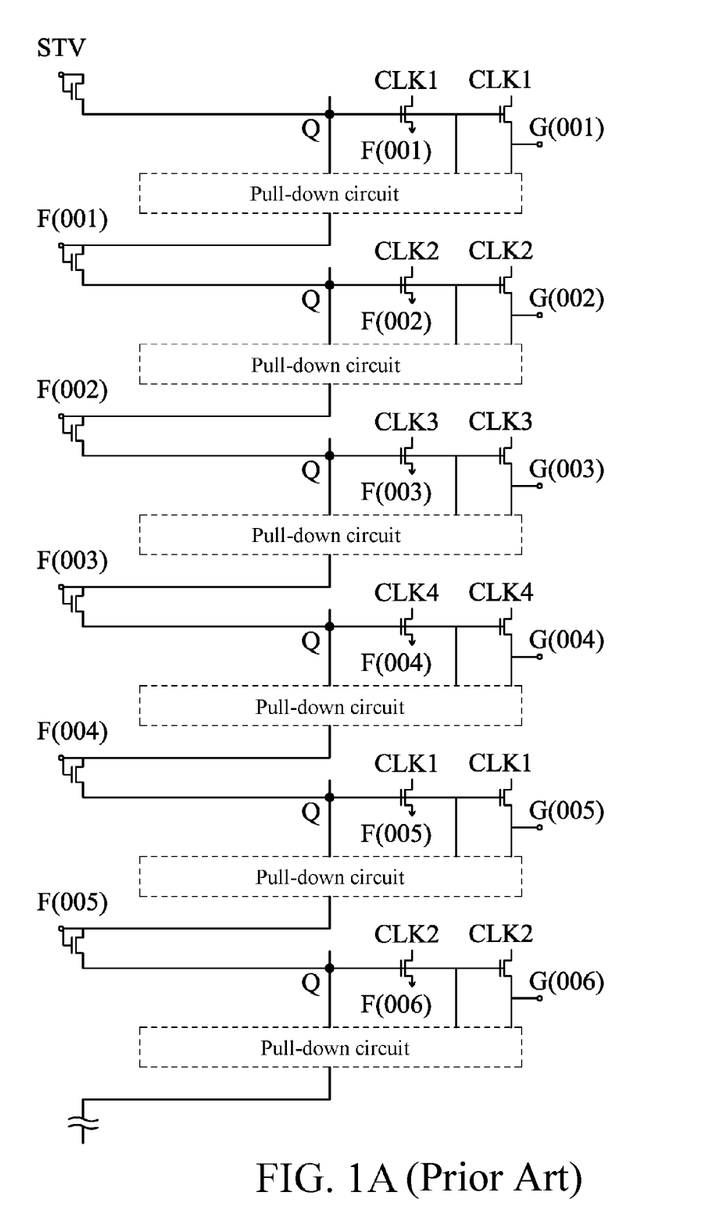
FIG. 1A is a structural diagram of a touch panel in the prior art.
Figure 1B:
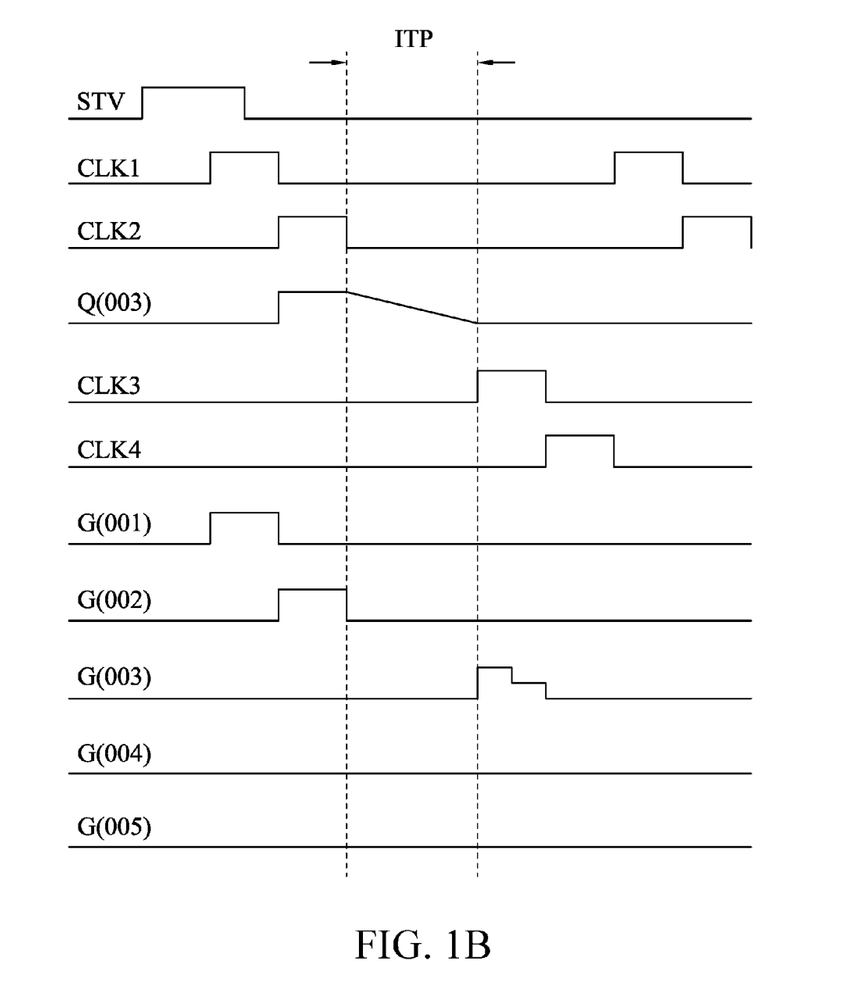
FIG. 1B is a waveform diagram of a signal output by a circuit in FIG. 1A.

FIG. 1A is a structural diagram of a touch panel in the prior art. FIG. 1B is a waveform diagram of a signal output by a circuit in FIG. 1A. For the prior art of in-cell touch, when in-cell touch sensing is executed, output signal of a gate driver circuit (such as GOA, gate driver on array) is required to be suspended to avoid a sensing error caused by noises. That is, sequential signals CLK1 to CLK4 and a trigger signal STV are all at low levels during touch sensing. Finishing the sensing, the stage of a gate driver previously suspended starts to output the signal. In this case, when in-cell touch sensing is executed, a pull-down circuit within the GOA generates a leakage current. As a result, a voltage level at a node Q of the current stage of the GOA changes from a high level to a low level once a time for touch sensing is excessively long. Starting to output signal from GOA after the sensing is completed, the current stage of the GOA generates relatively lower voltage level due to the lower voltage level at the node Q. In the worst case, no signal is outputted from the GOA and circuit functions are consequently abnormal. As an example, in FIG. 1A and FIG. 1B, when outputting signal from G(002) is completed, the node Q at the stage of G(003) is pre-charged to a high level voltage. In this moment, touch sensing is started, and no signal is outputted from the GOA when the initial touch sensing signal (ITP) is enabling. However, once the enabling interval of the ITP reaches 200 microseconds, it makes the voltage level of Q(003) decrease from a high level due to the leakage of the pull-down circuit. When finishing the touch sensing to input the signal CLK3 to the GOA, G(003) begins to output the signal. At this time, a pulse or voltage level outputted from the G(003) becomes worse, of a lower level or disabled due to the level of Q(003) not being sufficient. Consequently, the GOA cannot successfully output the signal in sequence.

SUMMARY

The embodiment of the present invention provides a touch panel, including a first gate drive circuit, a first touch circuit, a second gate drive circuit, and a second touch circuit. The first touch circuit is electrically connected to the first gate drive circuit, and the first touch circuit includes a first capacitor. A second touch circuit is connected to the second gate drive circuit and includes a second capacitor, where the first capacitor and the second capacitor are connected in parallel.

In the embodiment of the present invention, the first touch circuit further includes a first switch, where the first capacitor is electrically connected to the first gate drive circuit by the first switch.

In the embodiment of the present invention, the second touch circuit further includes a second switch, where the second capacitor is electrically connected to the second gate drive circuit by the second switch.

In the embodiment of the present invention, the first gate drive circuit further includes a first timing circuit and a first pull-down circuit. The first pull-down circuit is separately electrically coupled to the first timing circuit and the first touch circuit, where the first capacitor is connected to the first pull-down circuit by the first switch.

In the embodiment of the present invention, the first timing circuit receives a first clock signal, the first touch circuit receives an initial touch sensing signal, and when the initial touch sensing signal is at a high level, the first clock signal is at a low level.

In the embodiment of the present invention, the second gate drive circuit further includes a second timing circuit; and a second pull-down circuit. The second pull-down circuit is separately coupled to the second timing circuit and the second touch circuit, and the second capacitor is connected to the second pull-down circuit by using the second switch.

The embodiment of the present invention provides a touch panel, including: a plurality of gate drive circuits, a plurality of touch circuits, a plurality of capacitors, and N clock signals. The plurality of touch circuits is respectively electrically connected to the gate drive circuits, so that the gate drive circuits and the touch circuits form a multi-stage touch gate drive circuit. The plurality of capacitors is respectively disposed in the touch circuits and includes M capacitors that are connected in parallel. N clock signals are respectively electrically received by the gate drive circuits, where N and M are both positive integers, and M is less than N.

In the embodiment of the present invention, the gate drive circuits are connected in series to form a multi-stage shift register circuit, and the N clock signals are arranged in sequence and periodically to be input to the multi-stage shift register circuit.

In the embodiment of the present invention, the touch circuits separately include a first switch, and the touch circuits are respectively connected to the plurality of gate drive circuits by the first switch.

In the embodiment of the present invention, the capacitors separately include a first end and a second end, the second end is electrically coupled to the first switch disposed in the same touch circuits, and the first ends of M capacitors are all electrically connected to form a parallel connection.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

Unless otherwise denoted, a same number or symbol in different drawings is generally regarded as a corresponding component. The drawings are intended to clearly show association between the embodiments, and are not intended to show actual dimensions.

DETAILED DESCRIPTION

The embodiments of the present invention are disclosed below with reference to the accompanying drawings. For clear description, many details in practice will be described together in the following description. However, it should be understood that these details in practice should not be used to limit the present invention. That is, in some embodiments of the present invention, these details in practice are not essential. In addition, to simplify the accompanying drawings, some conventional structures and elements are shown in a simple schematic manner in the accompanying drawings.

In addition, the terms, such as "comprise", "include", "have", and "contain", used herein are all non-exclusive words, that is, refer to "include, but is not limited thereto".

The term "and/or" used herein includes any or all combinations of the objects described. In addition, regarding the terms "connected", "electrically connected", and "electrically coupled" that are used in this disclosure, if it is described that the connection should be direct, it is configured that a connection relationship between two objects is direct.

Figure 2:
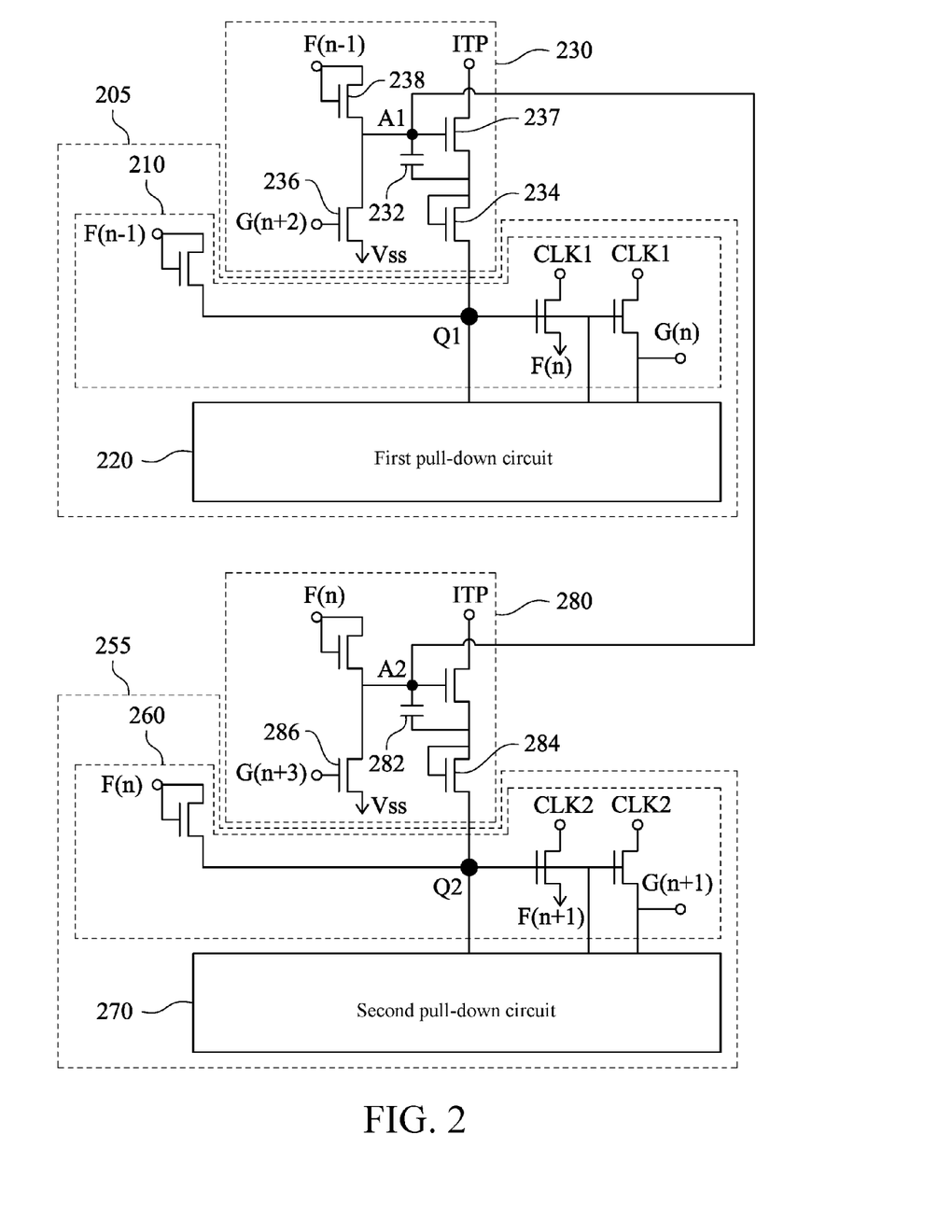
FIG. 2 is a structural diagram of a touch panel according to a first embodiment of the present invention.

FIG. 2 is a structural diagram of a touch panel according to a first embodiment of the present invention. In the embodiment of the invention, the touch panel includes a plurality of gate drive circuits and a plurality of groups of touch circuits. Each gate drive circuit is separately connected to a group of touch circuits to form a single-stage touch gate drive circuit, so that the touch panel includes a multi-stage touch gate drive circuit. For ease of description, an output or input signal of the touch gate drive circuit at a specific stage is represented by using n. For example, n is an integer greater than zero, and an output signal generated from the $n^{th}$ stage of the touch gate drive circuit is G(n). As shown in a first embodiment of FIG. 2, the touch panel includes: a voltage source Vss, an initial touch sensing signal ITP, clock signals CLK1 and CLK2, trigger signals F(n−1) and F(n), output signals G(n) and G(n+1), input signals G(n+2) and G(n+3), a first gate drive circuit 205, a second gate drive circuit 255, a first touch circuit 230, and a second touch circuit 280. The first touch circuit 230 is connected to the first gate drive circuit 205 at Q1, and the second touch circuit 280 is connected to the second gate drive circuit 255 at Q2. That is, the first gate drive circuit 205 is electrically coupled to the first touch circuit 230, and the second gate drive circuit 255 is electrically coupled to the second touch circuit 280. In addition, the first gate drive circuit 205 and the second gate drive circuit 255 respectively receive different clock signals CLK1 and CLK2. In this embodiment, the first gate drive circuit 205 and the first touch circuit 230 are considered as a touch gate drive circuit at a current stage (the $n^{th}$ stage), and the second gate drive circuit 255 and the second touch circuit 280 are considered as a touch gate drive circuit at the next stage (the $(n+1)^{th}$ stage). At the current stage (the $n^{th}$ stage), the trigger signal F(n−1) generated from a touch gate drive circuit at a previous stage is received by the touch drive circuit, and trigger signal F(n) generated from a touch gate drive is used as a trigger signal by the touch gate drive circuit at the next stage (the $(n+1)^{th}$ stage), and so on. Likewise, at the current stage (the $n^{th}$ stage), the output signal G(n) is generated from the touch drive circuit, and the output signal G(n) is also used as the input signal G(n) to be received by a touch gate drive circuit at the previous stage (the $(n-2)^{th}$ stage) (the $(n-2)^{th}$ stage is not illustrated), and so on.

In this embodiment, the first touch circuit 230 includes four thin film transistors and a capacitor. For example, the first touch circuit 230 includes a first switch 234, a first capacitor 232, a thin film transistor 236, a thin film transistor 237, and a thin film transistor 238. The first capacitor 232 is connected to the first gate drive circuit 205 by the first switch 234, wherein the first switch 234 is a diode. The first touch circuit 230 receives the initial touch sensing signal ITP, the trigger signal F(n−1), and the input signal G(n+2). Specifically, a first end of the thin film transistor 237 receives the initial touch sensing signal ITP, a second end of the thin film transistor 237 is electrically connected to the first switch 234, and a gate control end of the thin film transistor 237 is electrically coupled to the thin film transistor 238. The first capacitor 232 is separately electrically connected to the second end and the gate control end of the thin film transistor 237. In addition, the first end and the gate control end of the thin film transistor 238 are electrically connected to each other to receive the trigger signal F(n−1), and the second end of the thin film transistor 238 is electrically connected to the thin film transistor 236. A gate control end of the thin film transistor 236 receives the input signal G(n+2), and a second end of the thin film transistor 236 is electrically connected to the voltage source Vss. However, there is no limitation imposed in the present invention. For different designs and requirements, there are other kinds of transistors, such as P type TFT, N type TFT, NMOS, PMOS, and so on, and different quantities of capacitors in touch circuits.

In the embodiments, the first gate drive circuit 205 includes a first timing circuit 210 and a first pull-down circuit 220, and the first timing circuit 210 receives the first clock signal CLK1 and the trigger signal F(n−1). When the first touch circuit 230 executes sensing, the first clock signal CLK1 and the trigger signal F(n−1) received by the first timing circuit 210 are at a low level to avoid a sensing error caused by noise interference. In addition, the first touch circuit 230, the first timing circuit 210, and the first pull-down circuit 220 are electrically coupled to each other through a node Q1, so as to generate the output signal G(n) and the trigger signal F(n). The trigger signal F(n) is used as a trigger signal of a gate drive circuit at a next stage. As shown in the embodiment of FIG. 2, the trigger signal F(n) generated from the first gate drive circuit 210 is used as an input signal of the second gate drive circuit 255 (the next stage of the gate drive circuit).

In the embodiment shown in FIG. 2, the second touch circuit 280 includes a second capacitor 282 and a second switch 284. The second capacitor 282 is connected to the second gate drive circuit 255 through the second switch 284, wherein the second switch 284 is a diode. Specifically, the second touch circuit 280 is approximately the same as the foregoing first touch circuit 230 and only differs from the foregoing first touch circuit 230 in different input signals. For example, the second touch circuit 280 receives an input signal G(n+3) and a trigger signal F(n). The second gate drive circuit 255 further includes a second timing circuit 260 and a second pull-down circuit 270. The second timing circuit 260 receives the second clock signal CLK2 and the trigger signal F(n). Likewise, when the second touch circuit 280 executes sensing, the second clock signal CLK2 is at a low level to avoid a sensing error caused by noise interference.

Referring to the first embodiment of FIG. 2, a node A1 of the first touch circuit 230 and a node A2 of the second touch circuit 280 are connected to each other to form a parallel connection between the first capacitor 232 and the second capacitor 282. In detail, in a conventional architecture of FIG. 1, assume that at least a touch circuit with a large capacitance value of C needs to achieve that an expected node Q remains at a high level. According to a capacitance parallel connection between the first touch circuit 230 and the second touch circuit 280 in the embodiment of FIG. 2, each of capacitance values of the first capacitor 232 and the second capacitor 282 is C/2 to prevent an expected effect of charge leaking out. In other words, the first capacitor 232 and the second capacitor 282 are connected in parallel to make a capacitance value generated by the touch circuit at each stage still be C, thus avoiding electric quantity Q leaking out due to an excessively long time of touch sensing. Therefore, in this embodiment, by means of the design of a capacitance parallel connection between the first touch circuit 230 and the second touch circuit 280, a capacitance value needed by a capacitor in each touch circuit decreases, thereby reducing an area of a correspondingly disposed capacitor. In addition, when the design is applied to a structure of a GOA, a relatively small area of the substrate is needed to dispose the gate drive circuit, to achieve an advantage of a slim border.

Figure 3:
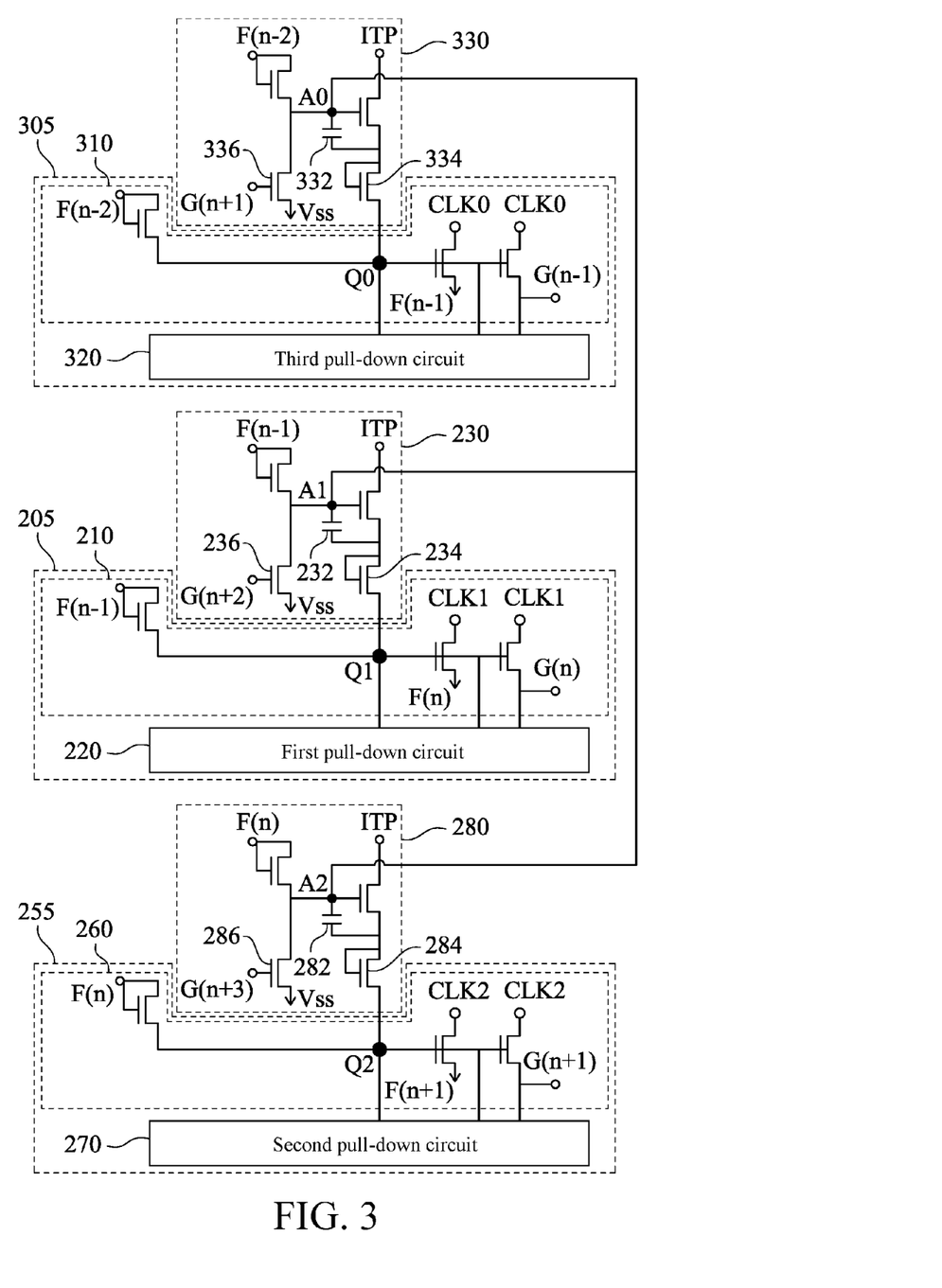
FIG. 3 is a structural diagram of a touch panel according to a second embodiment of the present invention.

FIG. 3 is a structural diagram of a touch panel according to a second embodiment of the present invention. The embodiment disclosed in FIG. 3 includes three gate drive circuits and touch circuits. The embodiment of FIG. 3 of the present invention further includes a third gate drive circuit 305 and a third touch circuit 330, in comparison with the embodiment of FIG. 2. The third gate drive circuit 305 includes a third timing circuit 310 and a third pull-down circuit 320. Likewise, in the embodiment of FIG. 3, the third gate drive circuit 305 and the third touch circuit 330 are approximately the same as the gate drive circuit and the touch circuit that are described in the embodiment of FIG. 2. In this embodiment, the third gate drive circuit 305 and the third touch circuit 330 are considered as a touch gate drive circuit at a current stage, the first gate drive circuit 205 and the first touch circuit 230 are a touch gate drive circuit at the next stage, and the second gate drive circuit 255 and the second touch circuit 280 are a touch gate drive circuit at the next two stages.

In FIG. 3, the touch circuit at each stage receives the initial touch sensing signal ITP, the trigger signal F(n), and the output signal G(n). For example, in view of the current stage, the initial touch sensing signal ITP, the trigger signal F(n−2), an output signal G(n+1) are input signals for the third touch circuit 330. Likewise, in view of the next stage, the initial touch sensing signal ITP, the trigger signal F(n−1), and the output signal G(n+2) are input signals for the first touch circuit 230. This process is repeated on input signals of subsequent touch circuits, and details are not described again. In addition, the timing circuit at each stage receives the trigger signal F(n) and the timing signal, and generates the output signal G(n). In the current stage, the third timing circuit 310 receives the trigger signal F(n−2) and the clock signal CLK0, and generates the output signal G(n−1). Likewise, in the next stage, the third timing circuit 210 receives the trigger signal F(n−1) and the clock signal CLK1, and generates the output signal G(n). This process is repeated on input and output signals of subsequent timing circuits, and details are not described herein again. In addition, the touch circuit, the timing circuit, and the pull-down circuit 220 at each stage are electrically coupled to each other by a node Q, so as to generate the output signal G(n) and the trigger signal F(n). The trigger signal F(n) is used as a trigger signal of the gate drive circuit at the next stage. As shown in the embodiment of FIG. 3, the trigger signal F(n−1), such as the trigger signal F(n−1), generated from the third gate drive circuit 305 is used as an input signal of the first gate drive circuit 205 at the next stage.

Referring to the embodiment in FIG. 3, a node A0 of the third touch circuit 330, a node A1 of the first touch circuit 230, and a node A2 of the second touch circuit 280 are connected to each other, to form a parallel connection among a third capacitor 332, the first capacitor 232, and the second capacitor 282. In detail, in a conventional architecture of FIG. 1, assume that at least a touch circuit with a large capacitance value of C needs to achieve that an expected node Q remains at a high level. According to a capacitance parallel connection among the first touch circuit 230, the second touch circuit 280, and the third touch circuit 330 in the embodiment of FIG. 3, each of capacitance values of the first capacitor 232, the second capacitor 282, and the third capacitor 332 is C/3 to prevent an expected effect of charge leaking out. In other words, the first capacitor 232, the second capacitor 282, and the third capacitor 332 are connected in parallel to make a capacitance value generated by the touch circuit at each stage still be C, avoiding electric quantity Q leaking out due to an excessively long time of touch sensing. Therefore, in this embodiment, by means of the design of a capacitance parallel connection among the first touch circuit 230, the second touch circuit 280, and the third capacitor 330, a capacitance value needed by a capacitor in each touch circuit decreases, thereby reducing an area of a correspondingly disposed capacitor. In addition, when the design is applied to a structure of a GOA, a relatively small area of the substrate area is used to dispose the gate drive circuit, to achieve an advantage of a slim border.

Specifically, the touch panel in the embodiment of the present invention includes: a plurality of gate drive circuits, a plurality of touch circuits, a plurality of capacitors, and N clock signals. The plurality of touch circuits is respectively connected to the gate drive circuits, and the plurality of capacitors are respectively disposed in the plurality of touch circuits. In this way, each gate drive circuit matches with a touch circuit to form a single-stage touch gate drive circuit, so that the touch panel includes a multi-stage touch gate drive circuit. In addition, in the multi-stage touch gate circuit, M capacitors are connected in parallel and the multi-stage touch gate circuit receives the N timing signals. N and M are both positive integers, wherein M is greater than 1, and M is less than N.

In other words, the plurality of gate drive circuits is connected in series to form a multi-stage shift register circuit, and the N clock signals are arranged in sequence and periodically input into the multi-stage shift register circuit. In this embodiment, a second end of the capacitor is electrically coupled to the first switch disposed in the same touch circuits, and the first ends of the M capacitors are all electrically connected to each other to form a parallel connection.

Figure 4A:
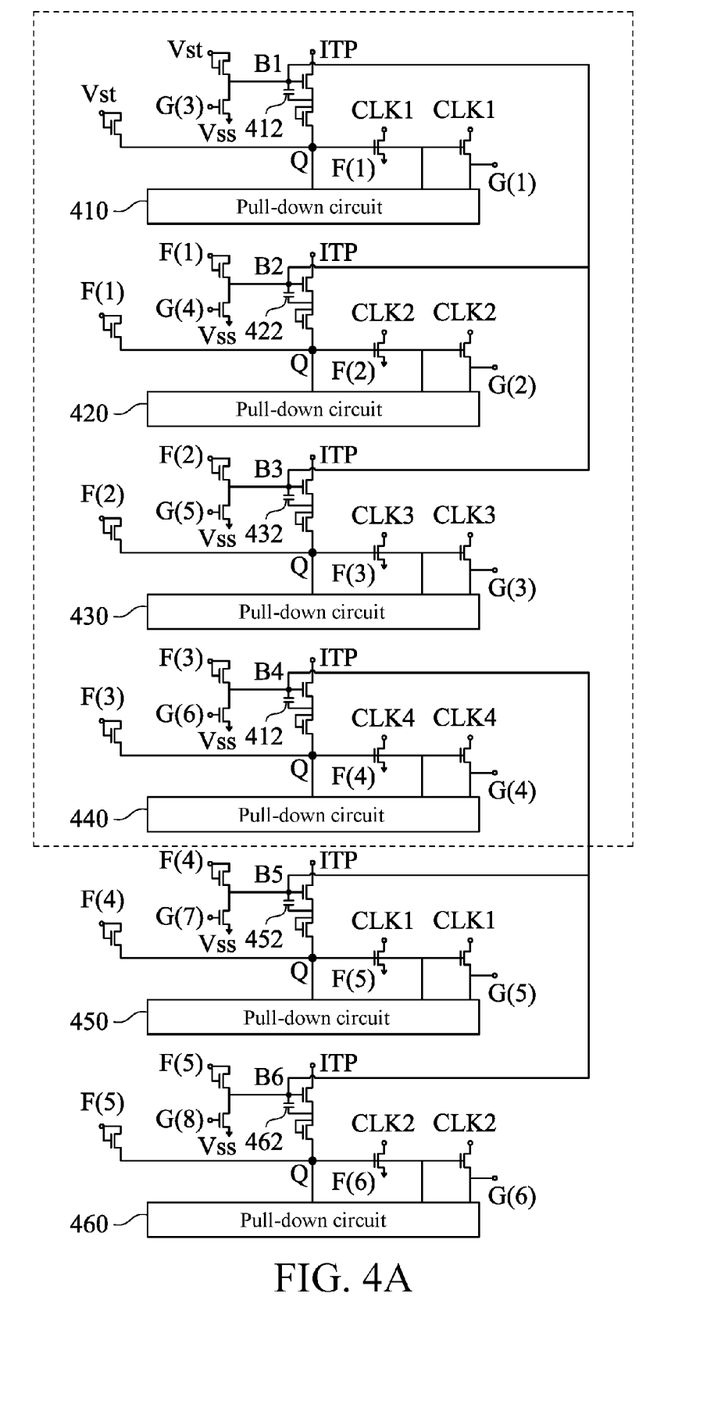
FIG. 4A is a structural diagram of a touch panel according to a third embodiment of the present invention.
Figure 4B:
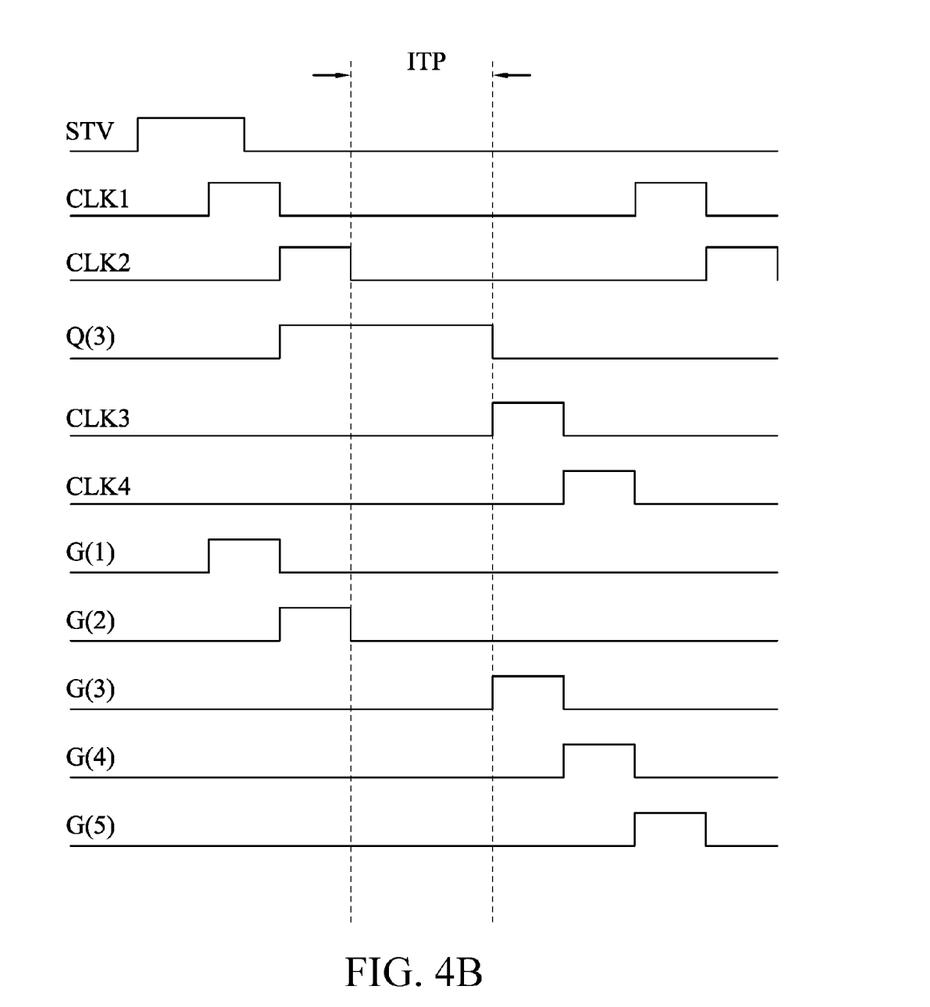
FIG. 4B is a waveform diagram of a signal output by a circuit in FIG. 4A.

FIG. 4A is a schematic diagram of a touch panel according to a third embodiment of the present invention, and FIG. 4B is a waveform diagram of a signal output by a circuit in FIG. 4A. For ease of description, the embodiments of FIG. 4A and FIG. 4B are described by illustrating a six-stage touch gate drive circuit (or a six-stage shift register circuit). In this embodiment, the clock signals are four sequential signals, namely, CLK1, CLK2, CLK3, and CLK4, and are output in sequence and periodically from a multi-stage shift register circuit (a first-stage gate drive circuit, a second-stage gate drive circuit, a third-stage gate drive circuit, a fourth-stage gate drive circuit, a fifth-stage gate drive circuit, a sixth-stage gate drive circuit . . . ). As shown in FIG. 4A, the first-stage touch gate drive circuit receives an initial trigger signal Vst (a trigger signal received by the first-stage touch gate drive circuit is the initial trigger signal Vst), and the first-stage touch gate drive circuit can generate a trigger signal F(1) as a trigger signal received by the second-stage touch gate drive circuit. By analogy, each of the touch gate drive circuits receives a trigger signal F(n−1) generated from a touch gate drive circuit at a previous stage and each of the touch gate drive circuits generates a trigger signal F(n). Taking the second-stage touch gate drive circuit in FIG. 4A as an example, the second-stage touch gate drive circuit receives the trigger signal F(1) and generates a trigger signal F(2) as a trigger signal received by the third-stage touch gate drive circuit. In the embodiments of FIG. 4A and FIG. 4B, the connection between the gate drive circuits and the touch circuits is presented in the foregoing embodiments, and details are not described again. However, the third embodiment is different from the second embodiment in terms of a parallel connection aspect. Details are described below.

In the embodiment of FIG. 4A, gate drive circuits from the first stage to the fourth stage are one group, and their clock signals are respectively CLK1, CLK2, CLK3, and CLK4 (represented by dashed line boxes). Gate drive circuits at the next two stages are another group, and their sequential signals are respectively CLK1 and CLK2. The first-stage touch circuit includes a capacitor 412, the second-stage touch circuit includes a capacitor 422, the third-stage touch circuit includes a capacitor 432, and the capacitor 412, the capacitor 422, and the capacitor 432 are connected in parallel by node B1, node B2, and node B3. It results in reducing the area of the capacitors.

There are four clock signals, namely, CLK1, CLK2, CLK3, and CLK4, in this embodiment. Every four stages of the gate drive circuits are for one group, and receive different timing signals, that is, N=4. In view of a capacitance parallel connection, every three stages of touch circuits form a capacitance parallel connection, that is, M=3, but the present invention is not limited thereto. For four clock signals, every two stages or every three stages of the touch circuits form a capacitance parallel connection where M is less than N. Therefore, the quantity of stages of a capacitance parallel connection of the touch circuits needs to be less than or equal to the quantity of clock signals, so that efficiency of the touch panel can be maintained in an optimal state. For example, eight clock signals are used as input signals, and a capacitance parallel connection is formed every two stages, every three stages, . . . , or every seven stages of the touch circuits. 16 sequential signals are used as input signals, and a capacitance parallel connection is formed every two stages, every three stages, . . . , or every 15 stages of the touch circuits.

Figure 5A:
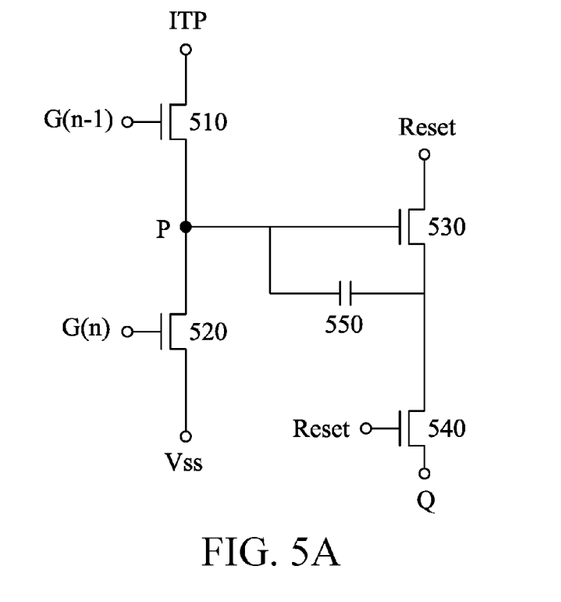
FIG. 5A, FIG. 5B, and FIG. 5C are structural diagrams of a touch circuit according to other embodiments of the present invention.
Figure 5B:
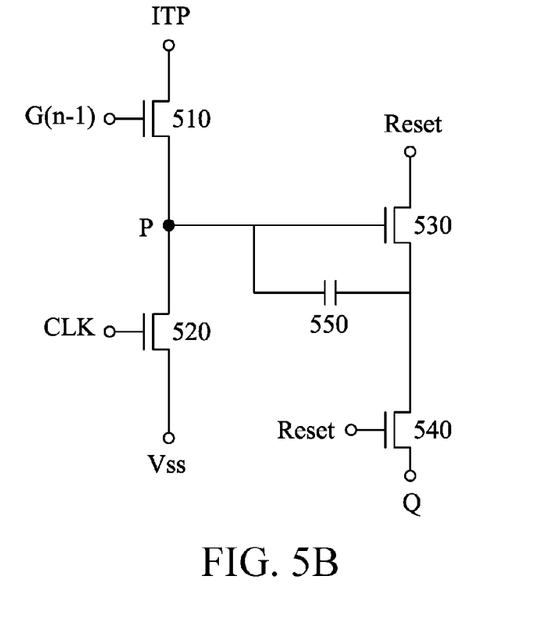
Figure 5C:
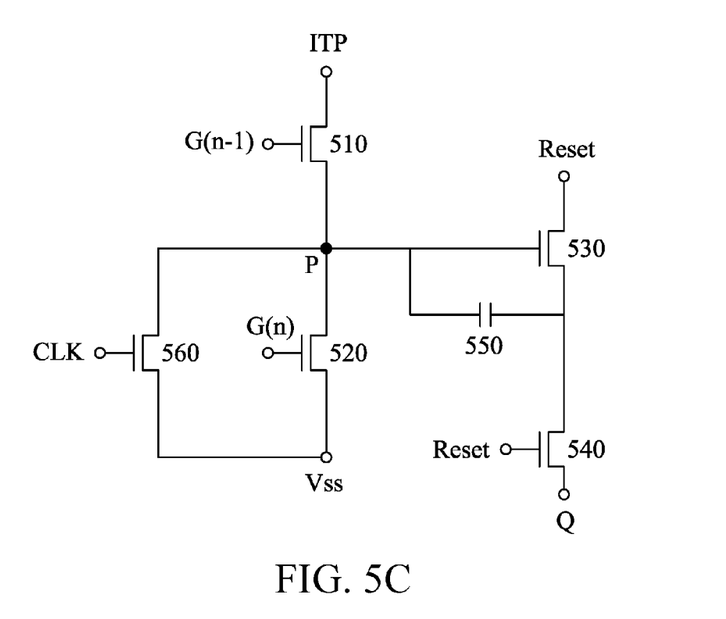

In the foregoing embodiment, the touch circuit includes four transistors and a capacitor, but the present invention is not limited thereto. Referring to FIG. 5A, FIG. 5B, and FIG. 5C, FIG. 5A, FIG. 5B, and FIG. 5C are respectively different embodiments of the touch circuit, and for ease of description, for an output or input signal of a touch gate drive circuit at each stage, n is used to represent a signal at a particular stage. For example, n is an integer greater than 0, and if the $n^{th}$ stage is used for description, a generated output signal is G(n). As shown in FIG. 5A, the touch circuit includes four transistors and a capacitor, and receives an input signal G(n−1), an input signal G(n), an initial touch sensing signal ITP, a voltage of the voltage source Vss and a reset signal Reset and a node Q is connected to a gate drive circuit. In detail, in the embodiment of FIG. 5A, the touch circuit includes a first thin film transistor 510, a second thin film transistor 520, a third thin film transistor 530, a fourth thin film transistor 540, and a first capacitor 550. A first end of the first thin film transistor 510 receives the initial touch sensing signal ITP, a second end is electrically connected to a first end of the second thin film transistor 520, and a gate control end receives the input signal G(n−1). A second end of the second thin film transistor 520 receives the voltage provided by the voltage source Vss, and a gate control end receives the input signal G(n). A first end of the third thin film transistor 530 receives the reset signal Reset, and the gate control end is electrically connected to the second end of the first thin film transistor 510. A first end of the fourth thin film transistor 540 is electrically connected to a second end of the third thin film transistor 530, the reset signal Reset is input to the gate control end, and a second end is a node Q. The node Q is used to electrically connect to a gate drive circuit (not shown) at the same stage. In addition, two ends of the first capacitor 550 are respectively electrically connected to the gate control end and the second end of the third thin film transistor 530, so that a node P is formed at one end of the first capacitor 550. The node P is used as the first capacitor electrically connected to a touch circuit at a different stage, to achieve an effect of a parallel connection between capacitors. In principle, operations on signals are the same as those in the above. However, when the reset signal Reset is used for performing touch sensing (actuation of an initial touch sensing signal ITP), it is started at a high level, so that the node Q remains at a high level. In this embodiment, when the reset signal Reset is at a high level, charges are supplemented at the node Q, thereby avoiding the voltage level of the node Q decreasing during an excessively long touch sensing time. Otherwise, consequently, an output signal of the gate drive circuit cannot be normally transferred to a next stage after the touch sensing.

The structure of the touch circuit described in FIG. 5B is approximately the same as that in FIG. 5A, and only differs from FIG. 5A in that the gate control end of the second thin film transistor 520 receives a clock signal CLK. Circuit operation and effects are the same as those described in FIG. 5A, and details are not described herein again. FIG. 5C mainly differs from FIG. 5A in that in the touch circuit embodiment disclosed in FIG. 5C, a fifth thin film transistor 560 is structurally further added. In the embodiment of FIG. 5C, a gate control end of the fifth thin film transistor 560 receives a clock signal CLK, a first end of the fifth thin film transistor 560 is connected to the second end of the first thin film transistor 510, and a second end of the fifth thin film transistor 560 receives the voltage provided by the voltage source Vss. Circuit operation and effects are the same as those described in FIG. 5A, and details are not described herein again.

The embodiments of the present invention provide a touch panel, in which gate drive circuits and touch circuits at two or more stages are connected in parallel, so as to achieve capacitance sharing. Under the effect of capacitance sharing, a capacitance value included in the touch circuit at each stage is reduced in multiples. In this way, a problem of increased manufacturing costs due to that an external capacitor with a large capacity is added, and the area of a corresponding circuit board needs to be increased are avoided.

Although the present invention is disclosed above by using various implementation manners, these implementation manners are not intended to limit the present invention. Any person skilled in the art may make various changes and modifications without departing from the spirit and scope of the present invention, and therefore, the protection scope of the present invention should be as defined by the appended claims.

What is claimed is:

1. A touch panel, comprising:
   a first gate drive circuit, comprising a first timing circuit and a first pull-down circuit;
   a first touch circuit, electrically coupled to the first gate drive circuit and comprising a first capacitor and a first switch, wherein the first capacitor is electrically connected to the first gate drive circuit by the first switch;
   a second gate drive circuit; and
   a second touch circuit, electrically coupled to the second gate drive circuit and comprising a second capacitor and a second switch, wherein the second capacitor is electrically connected to the second gate drive circuit by the second switch, and the first capacitor and the second capacitor are connected in parallel,
   wherein the first pull-down circuit is separately electrically coupled to the first timing circuit and the first touch circuit, and the first capacitor is connected to the first pull-down circuit by the first switch.

2. The touch panel according to claim 1, wherein the first timing circuit receives a first clock signal, the first touch circuit receives an initial touch sensing signal, and when the initial touch sensing signal is at a high level, the first clock signal is at a low level.

3. The touch panel according to claim 1, wherein the second gate drive circuit further comprises:
   a second timing circuit; and
   a second pull-down circuit, separately coupled to the second timing circuit and the second touch circuit, wherein the second capacitor is connected to the second pull-down circuit by the second switch.

4. A touch panel, comprising:
   a plurality of gate drive circuits, wherein the gate drive circuits are connected in series to form a multi-stage shift register circuit;
   a plurality of touch circuits, respectively electrically connected to the gate drive circuits, so that the gate drive circuits and the touch circuits form a multi-stage touch gate drive circuit;
   a plurality of capacitors, respectively disposed in the touch circuits and comprising M capacitors that are connected in parallel; and
   N clock signals, respectively electrically received by the plurality of gate drive circuits, wherein N and M are both positive integers, M is less than N, and the N clock signals are arranged in sequence and periodically to be input to the multi-stage shift register circuit.

5. The touch panel according to claim 4, wherein the touch circuits separately comprise a first switch, and the touch circuits are respectively connected to the plurality of gate drive circuits by the first switch.

6. The touch panel according to claim 5, wherein the capacitors separately comprise a first end and a second end, the second end is electrically coupled to the first switch disposed in the same touch circuits, and the first ends of the M capacitors are all electrically connected to form parallel connection.

* * * * *